US009194721B2

(12) United States Patent
Backes

(10) Patent No.: US 9,194,721 B2
(45) Date of Patent: Nov. 24, 2015

(54) DEVICE AND METHOD FOR THE INDUCTIVE DETECTION OF A POSITION

(75) Inventor: Ulrich Backes, Radolfzell (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 395 days.

(21) Appl. No.: 13/472,841

(22) Filed: May 16, 2012

(65) Prior Publication Data

US 2013/0127449 A1 May 23, 2013

(30) Foreign Application Priority Data

May 23, 2011 (DE) .......................... 10 2011 102 796

(51) Int. Cl.
*G01B 7/30* (2006.01)
*G01D 5/22* (2006.01)
*G01B 7/00* (2006.01)
*G01B 7/02* (2006.01)

(52) U.S. Cl.
CPC .............. *G01D 5/2291* (2013.01); *G01B 7/003* (2013.01); *G01B 7/023* (2013.01); *G01B 7/30* (2013.01)

(58) Field of Classification Search
CPC ....... G01D 5/2291; G01D 7/30; G01D 7/023; G01D 7/003
USPC ........................................ 324/207.15–207.16
See application file for complete search history.

(56) References Cited

U.S. PATENT DOCUMENTS

| 4,042,876 | A | * | 8/1977 | Visioli, Jr. ................ 324/207.16 |
| 4,403,515 | A | * | 9/1983 | Iwasaki .................... 324/207.24 |
| 4,553,040 | A | * | 11/1985 | Truper et al. ................ 307/116 |
| 4,644,570 | A | * | 2/1987 | Brosh et al. ...................... 377/17 |
| 4,678,994 | A | * | 7/1987 | Davies .......................... 324/236 |
| 5,107,212 | A | * | 4/1992 | Dobler et al. ............ 324/207.16 |
| 5,483,156 | A | * | 1/1996 | Nishihara ..................... 324/173 |
| 5,535,142 | A | * | 7/1996 | Mehnert et al. ............... 702/189 |
| 5,574,366 | A | * | 11/1996 | Joost ........................ 324/207.26 |
| 7,511,477 | B2 | * | 3/2009 | Niwa ........................ 324/207.16 |
| 7,586,303 | B2 | * | 9/2009 | Kirchdoerffer et al. . 324/207.26 |
| 2003/0179003 | A1 | | 9/2003 | Toda et al. |
| 2006/0152320 | A1 | | 7/2006 | Buhler |
| 2009/0243596 | A1 | | 10/2009 | Izak et al. |
| 2011/0127996 | A1 | * | 6/2011 | Schultze et al. ......... 324/207.25 |

FOREIGN PATENT DOCUMENTS

| CN | 1503896 | 6/2004 |
| CN | 1708671 | 12/2005 |
| CN | 101545754 | 9/2009 |
| DE | 103 41 485 | 4/2005 |

* cited by examiner

*Primary Examiner* — Jay Patidar
(74) *Attorney, Agent, or Firm* — Tarolli, Sundheim, Covell & Tummino L.L.P.

(57) ABSTRACT

A position sensor for the inductive detection of a position of a first component comprising a reference coil with respect to a second component comprising a reference body. A control and processing unit of the position sensor is coupled to the reference coil and is designed for issuing an output signal generating a current impulse in the reference coil. In addition, the control and processing unit is designed for evaluation of an oscillation generated by the current impulse in the reference coil as an input signal indicating the position of the reference body.

17 Claims, 8 Drawing Sheets

DEVICE AND METHOD FOR THE INDUCTIVE DETECTION OF A POSITION

BACKGROUND OF THE INVENTION

This invention relates to a position sensor for the inductive detection of a position of a first component comprising a reference coil with respect to a second component comprising a reference body. The invention also relates to an actuator-sensor device and to a method for the inductive detection of a position of a reference body with respect to a reference coil.

Position sensors operating in a contactless manner are employed in many fields of technology. In automotive engineering, contactless position sensors are employed for example as rotary switches or push buttons free from contact wear, in particular for rotary light switches. Such position sensors operate by using various physical measurement principles. Examples include an optical, capacitive or potentiometric measurement. However, the sensors mentioned above merely can be realized with comparatively high costs, in addition have a too large size and can merely be integrated with a high mounting effort. Sensors operating in a capacitive manner also are sensitive to moisture.

SUMMARY OF THE INVENTION

It is the object of the invention to provide a position sensor, an actuator-sensor device as well as a method for the inductive detection of a position, which is improved with regard to the problems known in the prior art.

In accordance with the present invention, there is provided a position sensor for the inductive detection of a position of a first component comprising a reference coil with respect to a second component comprising a reference body. Preferably, the first and the second component are an integral part of a position sensor. The position sensor can be a rotary encoder, a linear position transmitter or a proximity sensor, e.g. a push button. A preferred rotary encoder is a contactless rotary light switch, e.g. for a motor vehicle. The position sensor also comprises a control and processing unit, which preferably can be a microcontroller.

The control and processing unit can include an input and an output, which each are coupled to the reference coil. The control and processing unit is designed for issuing an output signal generating a current impulse in the reference coil. In addition, the control and processing unit is designed to evaluate an oscillation caused by this current impulse in the reference coil and use the same as an input signal indicating the position of the reference body with respect to the reference coil. The evaluation of the oscillation caused in the reference coil can be effected for example by means of a correspondingly programmed microcontroller.

The position sensor according to the aforementioned aspects of the invention is based on the physical effect that in the preferably metallically conductive reference body, which is permeated by the magnetic field of the reference coil, eddy losses are induced and the same lead to an energy loss of the magnetic field. Due to the occurring energy loss the coil voltage is reduced, which can be detected as an input signal indicating the position of the reference body with respect to the reference coil.

In accordance with aspects of the invention a current impulse is generated in the reference coil, and the occurring energy loss of the magnetic field is detected with reference to the resulting oscillation. It has been recognized that due to parasitic capacitances of the outer wiring and the reference coil a damped oscillation occurs in the same, and this effect can be utilized for the inductive position detection. As compared to solutions known from the prior art, the position sensor according to aspects of the invention has the advantage that the reference coil can be dimensioned smaller. In addition, a smaller coil excitation current and a smaller excitation frequency can be used. This is advantageous in particular with regard to the electromagnetic compatibility (EMC) of the position sensor.

The control and processing unit also can be designed to evaluate an amplitude of the oscillation generated by the current impulse in the reference coil. The height of this amplitude can be regarded as a measure for the energy loss caused by the reference body. An evaluation of the amplitude as an input signal indicating the position of the reference body therefore represents a particularly effective solution.

In accordance with further aspects of the invention, the output of the control and processing unit is coupled with one side of the reference coil via a first node. Preferably, the other side of the reference coil is coupled to a fixed reference potential, e.g. to ground. In addition a diode can be connected in forward direction between the first node and a second node, which can also be coupled with the input of the control and processing unit. A capacitor can be coupled between the second node and a fixed reference potential (preferably ground). This capacitor can be part of the evaluation and processing unit; it can, however, also be a separate component.

In solutions known from the prior art, which employ a similar measurement principle, it is always necessary that the coil excitation current or the excitation frequency at least have a certain magnitude and in addition a sufficiently large inductivity. Otherwise, a satisfactory sensitivity of the measuring device cannot be achieved. This is, however, mostly unpracticable for EMC reasons. In addition, wound coils must often be used, which means a cost disadvantage. The position sensor according to aspects of the invention overcomes these disadvantages, as for evaluating the oscillation in the reference coil a comparatively low inductivity and small excitation frequency can be used. In addition, a wound coil can be omitted. It is possible to use a flat coil of conductor paths integrated in a printed circuit board or a flat coil manufactured in MID technology as reference coil.

For evaluating the damped oscillation generated in the reference coil, the positive half-waves of this oscillation are rectified via the diode. The capacitor is charged by the positive voltage peaks. In accordance with this particularly simple and inexpensive embodiment, the voltage obtained via the capacitor can be detected as input signal at the input of the control and processing unit and serves as an input signal indicating the position between the reference body and the reference coil. It has been found that a capacitor of low capacitance can be used for this purpose, as it is already integrated for example in commercially available microcontrollers. Preferably, the same has a low capacitance, e.g. between 10 and 20 pF.

When the distance of the reference body to the reference coil is changed, the energy loss of the field of the reference coil caused by the eddy losses in the reference body is changed. This leads to a change in the voltage obtained at the capacitor. In various consecutive measurement cycles, the varying distance between reference body and reference coil can thus be detected.

In accordance with a further aspect of the invention, the current impulse coupled into the reference coil by the control and processing unit substantially can be defined by a resistor which is coupled between the first node and the output of the control and processing unit. The resistance is dimensioned corresponding to the current-carrying capacity of the output, preferably between 150 Ohm and 1000 Ohm.

In accordance with a further aspect of the invention a first switch, which preferably is a transistor, e.g. a MOSFET, can be connected between the diode and the second node. This second switch allows to separate the capacitor from the reference coil for the period of the current impulse. In addition, a second switch, which in turn preferably can be a transistor such as a MOSFET, can be coupled between the second node and a fixed reference potential, preferably ground. By opening the first and closing the second switch, the capacitor can be discharged before each new measurement cycle, so that a defined starting condition exists. During the detection of the positive half-waves of the damped oscillations occurring in the reference coil, the second switch can be opened and the first switch can be closed, so that charge can flow over the diode onto the capacitor. Preferably, the diode is a Schottky diode. This type of diode is characterized by a low forward voltage and short switching times (in the range of 100 ps) and thus is suitable for detecting the occurring positive half-waves of the damped oscillation also at high oscillation frequencies.

In accordance with a further aspect of the invention, the output of the control and processing unit is a digital output to which preferably a square-wave signal is applied. The rising and falling flank of this square-wave signal generates a current impulse in the reference coil, wherein the rise rate of the flanks decisively determines the achievable sensitivity. The input of the control and processing unit utilized for detection preferably is coupled with an A/D converter comprised by the same. The voltage obtained at the capacitor thus can directly be converted into a digital value, which is available for further digital processing.

Another advantageous position sensor comprises one or more reference coils, which in the same way as mentioned above are coupled with the remaining components of the position sensor. A series connection of several coils also is conceivable.

The windings of this/these reference coil(s) can be guided such that the same define a coil core which determines the shape of the magnetic field generated such that preferably a lateral displacement of the reference body (i.e. a displacement parallel to the plane in which the coil extends) or a vertical displacement of the reference body (i.e. a displacement of the reference body vertical to the plane of extension of the coil) is detectable. In other words, the shape of the magnetic field is established such that a small change of the position of the reference body in the one or other direction leads to a correspondingly strong change of the magnetic field acting on the reference body and generated by the reference coil. This location-dependent change of the magnetic field leads to a correspondingly strong change of the induced eddy currents. Preferably, the coil core (which also comprises an air coil) of the reference coil has a small cross-sectional area. There is obtained a needle-shaped magnetic field which has a strong gradient in lateral direction. Thus, a lateral displacement of the reference body preferably is detectable. In accordance with another aspect, the reference coil is designed such that its coil core has an oblong cross-sectional area. In this case, a lateral displacement of the reference body leads to a proportional change of the input signal. The oblong cross-sectional area can be line-shaped or curved, e.g. extend along a circular arc segment. In the latter case, a ring-shaped field exit occurs, which is particularly suitable for the construction of rotary angle sensors, as they are employed e.g. in contactless rotary light switches. Another position sensor can include a reference coil which has a coil core with relatively large cross-sectional area. Now, a square field exit occurs. Such magnetic field has a strong gradient in vertical direction. Thus, a vertical displacement of the reference body with respect to the reference coil preferably can be detected. This arrangement in particular is suitable for realizing a push-button switch, on whose actuation the reference body approaches the reference coil (or vice versa).

In position transmitter applications in safety-relevant fields, e.g. for automotive light switches, at least two physically different position detection methods must be used. A further position sensor according to aspects of the invention comes up to these requirements and includes a further unit for detecting the position between the first and the second component, wherein the detection performed by the further unit is based on a physical measurement principle different from an inductive position detection. Preferably, a capacitive position detection is used.

In accordance with a further aspect of the invention an actuator-sensor device is provided, which comprises a position sensor according to the aforementioned aspects of the invention and in addition an actuator. As a first one of two parts of the actuator acting with respect to each other, a permanent magnet is integrated into the second component. The magnetic field of this permanent magnet permeates the reference coil integrated into the first component, which is used as second one of the parts of the actuator acting with respect to each other. In addition, a switch, e.g. a MOSFET, can be connected between a supply voltage and the first node. In this case, the channel of the MOSFET is coupled with the supply voltage on the one hand and with the first node on the other hand. The control and evaluation unit also can include a further output, which is coupled with the switch for controlling the same. If a MOSFET is used, this further output is coupled with its gate.

The control and processing unit preferably is designed for the feedback control of the actuator. The same is controlled in response to a position between the first and the second component as determined by the position sensor. With such actuator-sensor device, a push button with haptic feedback can be constructed advantageously. For example, a vibration or force feedback can be effected. By alternately actuating the reference coil with a stronger low-frequency current on the one hand (activation of the actuator) and a weaker higher-frequency current on the other hand (activation of the sensor) a very compact and inexpensive push button with haptic feedback can be realized.

In accordance with a further embodiment, there is provided a method for the inductive detection of a position of a first component comprising a reference coil with respect to a second component comprising a reference body. First of all, an output signal generating a current impulse in the reference coil is coupled into the reference coil. This current impulse causes an oscillation in the reference coil, which in turn is evaluated as an input signal indicating the position of the reference body with respect to the reference coil. Preferably, the amplitude of the oscillation generated by the current impulse in the reference coil is evaluated. The evaluation of the oscillation preferably is effected by means of a correspondingly configured microcontroller.

Another method for the inductive position detection employs a control and processing unit whose input is coupled to the reference coil for receiving the input signal indicating the position. The output of the control and processing unit and one side of the reference coil are coupled to a first node. A diode can be connected in forward direction between the first node and a second node coupled with the input, and a capacitor can be coupled between the second node and a fixed reference potential. In this embodiment, the step of evaluating advantageously can be limited to an evaluation of the voltage obtained over the capacitor. This voltage already serves as an input signal indicating the position of the reference body with respect to the reference coil.

Further advantages connected with the method according to aspects of the invention have already been mentioned with regard to the position sensor according to aspects of the invention and therefore require no further explanation.

BRIEF DESCRIPTION OF THE DRAWINGS

Further features and advantages of the invention can be taken from the following description of advantageous exemplary embodiments with reference to the attached drawing, in which.

DESCRIPTION OF EXEMPLARY EMBODIMENTS

Figure 1:
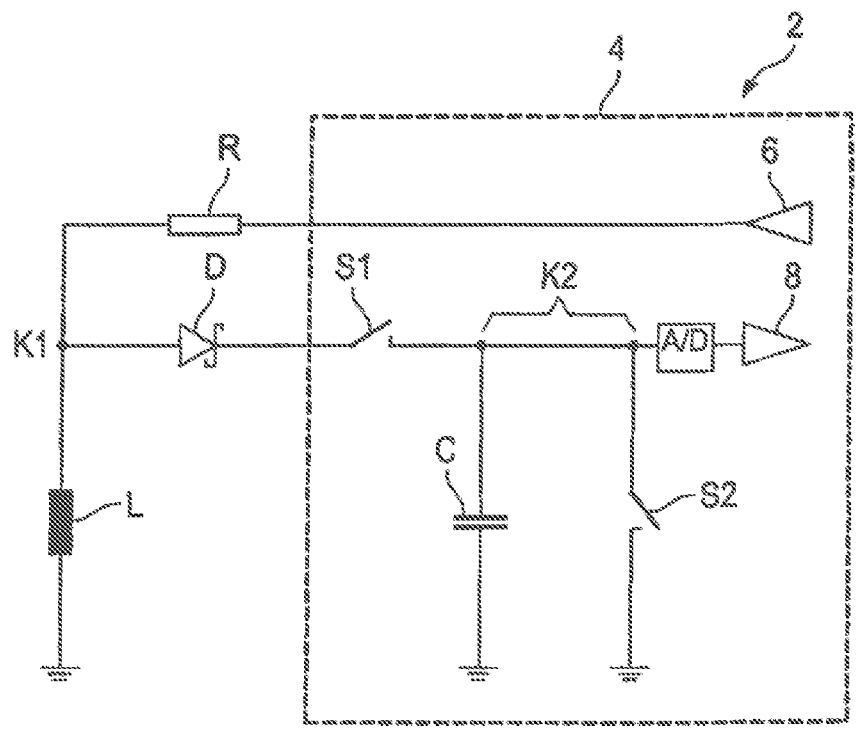
FIG. 1 shows a simplified circuit diagram of a position sensor according to an exemplary embodiment.

FIG. 1 shows a simplified circuit diagram of a position sensor 2, which includes a control and processing unit 4, with an output 6, preferably a digital output, and with an input 8 which for example is coupled to an A/D converter. In the following, it is assumed by way of example that the control and processing unit 4 is a microcontroller 4. Via a resistor R, its output 6 is coupled with a first node K1 with which in addition a first side of a reference coil L is coupled, whose other side is connected to a fixed reference potential, in this case to ground. With the first node K1 a diode D in addition is connected, which acts as rectifier diode and which preferably is a Schottky diode. The diode D is connected in forward direction between the first node K1 and a second node K2. Into this connection a first switch S1 is integrated. With the second node K2 a capacitor C with a capacitance between 10 and 20 pF and a second switch S2 are coupled in addition. As switches S1, S2, MOSFETS preferably are used. The respective other side of the capacitor C and the second switch S2 is coupled to a fixed reference potential, in the illustrated exemplary embodiment to ground. Other than in the exemplary embodiment shown in FIG. 1, both the capacitor C and the first and second switches S1, S2 can be configured as separate components, i.e. lying outside the microcontroller 4. The position sensor 2 also comprises a non-illustrated reference body which is permeated by the magnetic field generated by the reference coil L. The reference coil preferably is made of an electrically conductive material, e.g. of metal. The reference coil L preferably is a flat coil integrated into a circuit board, or a flat coil in MID technology.

Figure 2:
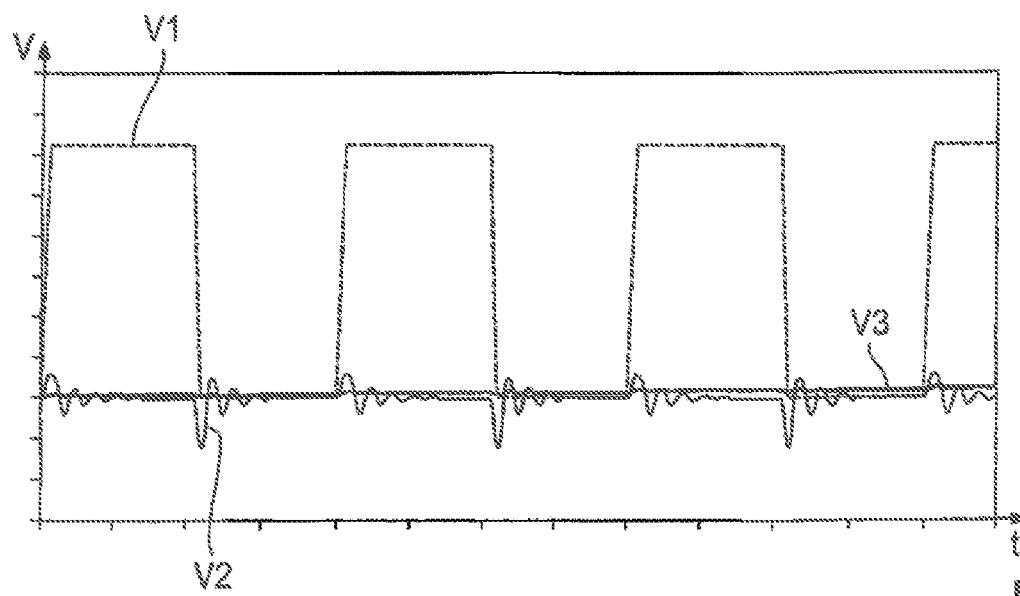
FIG. 2 shows a time-dependent curve of the voltage applied to a first output, to a reference coil and to a capacitor.

To the output 6 of the microcontroller 4, for example the square-wave voltage V1 shown in FIG. 2 is applied. At its rising and falling edges, the same generates a current impulse in the reference coil L, whose strength substantially is determined by the magnitude of the resistance R. Due to parasitic capacitances of the reference coil L a damped oscillation occurs in the same, whose voltage curve is shown in FIG. 2 as V2. The positive half-waves of the voltage V2 are rectified by the diode D and charge the capacitor C with closed first switch S1 and opened second switch S2. Charging the capacitor C is effected at the rising and falling flanks of the square-wave voltage V2. Consequently, the voltage V3 applied to the capacitor rises by a small value with each rising and falling flank of the square-wave voltage V1. Since the capacitor C only has a low capacitance (about 10 to 20 pF), a small number of switch-on and switch-off cycles already leads to charging the capacitor C to the peak value of the voltage V2 applied to the reference coil L minus the diode bias voltage of the diode D. The voltage V3 decreasing via the capacitor C can be measured at the input 8 of the microcontroller 4.

After the measurement, the first switch S1 is opened and the second switch S2 is closed, in order to discharge the capacitor C and prepare it for a new measurement cycle. If the capacitor C is configured as a discrete component outside the microcontroller 4, it is also possible to use larger capacitances, whereby the first switch S1 can be omitted.

If a reference body is present in the magnetic field generated by the reference coil L, eddy currents are induced in the same. The same lead to energy losses and to a reduction of the voltage V2 in the reference coil L. Consequently, the capacitor C also is charged less strongly. The difference between the maximum charging voltage of the capacitor C and the actually measured voltage is indicative for the magnitude of the energy losses and hence also for the position of the reference body. Thus, it can be detected how much the reference body has approached the reference coil L or what absolute position the reference body has.

Figure 3:
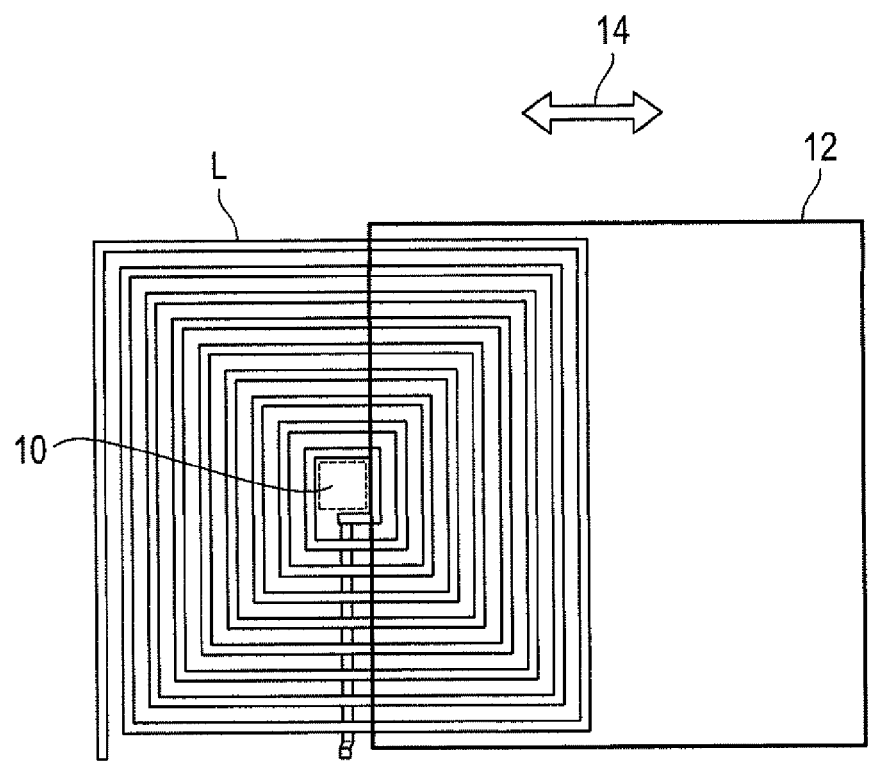
FIGS. 3 to 6 show various exemplary embodiments for reference coils.

FIG. 3 shows a first exemplary embodiment for a reference coil L configured as flat coil. The same has a central surface 10 which defines the cross-section of a coil core. The reference coil L shown in FIG. 3 has no separate coil core, it substantially is an air coil. The magnetic field exiting from the center of the reference coil L substantially is needle-shaped and has a high field gradient in a direction lateral to a plane of extension of the reference coil L. If a reference body 12 now is shifted in lateral direction 14, e.g. in FIG. 3 to the left or right, the voltage V3 detectable at the capacitor C breaks down to a minimum, as soon as the edge of the reference body 12 overlaps with the field exit window defined by the central surface 10. When shifting further, it remains at this low value. Thus, the illustrated geometry of the reference coil L preferably is suitable for switching applications with two states.

Figure 4:
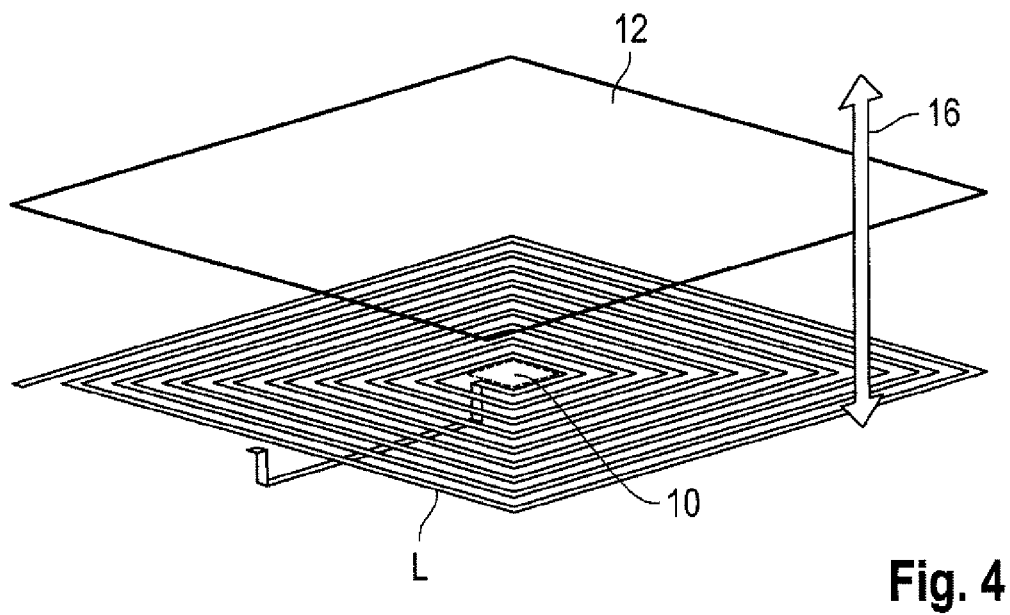

FIG. 4 shows a further exemplary embodiment for a reference coil L, which as compared to the reference coil L shown in FIG. 3 has a larger central surface 10, so that a substantially square field exit can be achieved. This reference coil L is particularly suitable for approach detection of the reference body 12 in a vertical direction 16. The strength of the magnetic field generated by the reference coil L decreases in vertical direction 16 with increasing distance of the reference body 12 from the reference coil L, so that with decreasing induced eddy currents the voltage V3 detectable at the capacitor C will also decrease.

Figure 5:
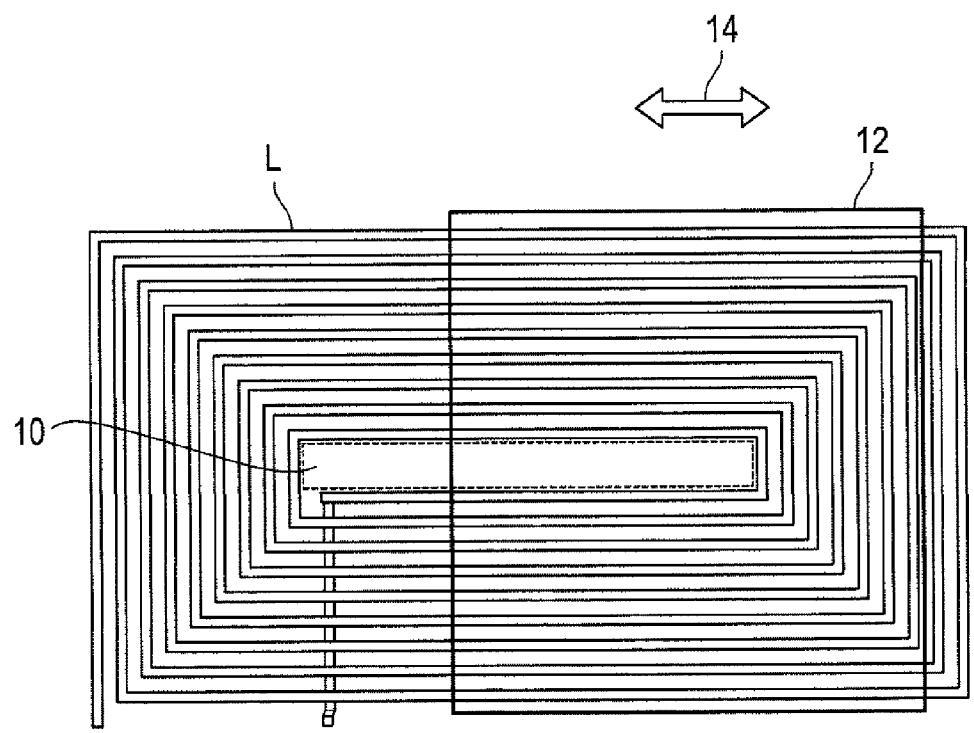
Figure 6:
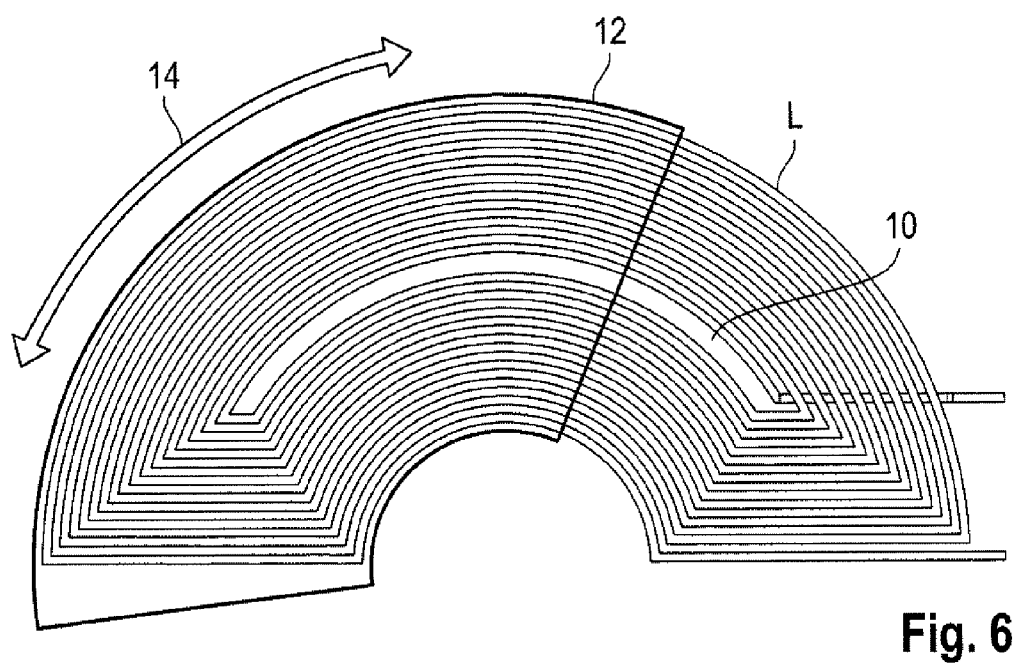

FIG. 5 shows a further exemplary embodiment for a reference coil L whose windings are configured such that an oblong linear central surface 10 is obtained. There is substantially defined a line-shaped field exit. The field lines of the magnetic field generated are substantially uniformly distributed in the region of the central surface 10. Thus, a linear relation is obtained between the displacement of the reference body 12 in a lateral direction 14 and the voltage V3 detectable at the capacitor C. An alternative aspect is shown in FIG. 6, in which the reference coil L has a central surface 10 which extends along a segment of a circle. There is obtained a substantially ring-shaped field exit of the magnetic field generated by the reference coil L. Similar to the exemplary embodiment shown in FIG. 5, a linear relation exists between the signal detectable at the input 8 of the microcontroller 4 and the rotation of the reference body 12 corresponding to the direction 14. A position sensor 2, with a reference coil L as shown in FIG. 6, preferably is useful for the construction of a rotary angle sensor, e.g. for a rotary light switch.

Figure 7A:
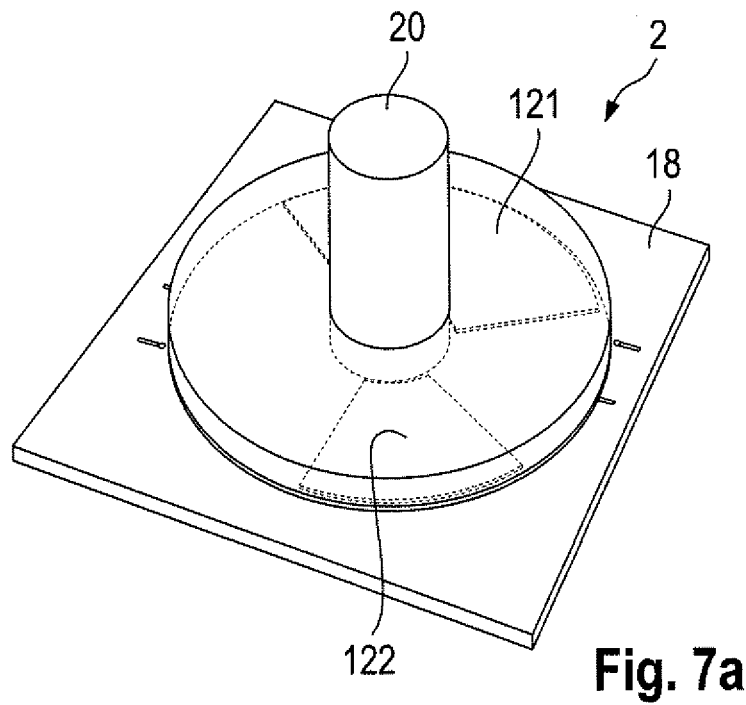
FIGS. 7a and 7b show a position sensor designed as rotary angle sensor according to a further exemplary embodiment.
Figure 7B:
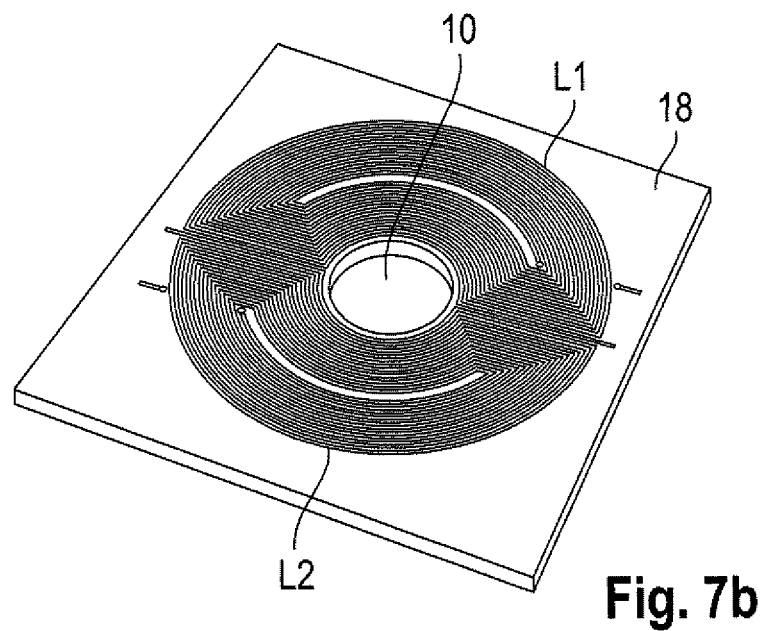

FIG. 7 shows an exemplary embodiment for a rotary angle sensor which covers a large angular range. This is accomplished by combining several reference coils. In an outer region shown at the top in FIG. 7b a first reference coil L1 is located, whose windings in the lower half are guided from the outside to the inside into a portion adjacent to the central surface 10. Correspondingly, the windings of a second reference coil L2 are guided on the outside in the lower region in FIG. 7b and on the inside in the upper region, i.e. close to the central surface 10. The first and second reference coils L1, L2 are an integral part of a first component 18 of the position sensor 2 shown in FIG. 7b, which is designed in the form of a rotary encoder. A second component 20 comprises a first and a second reference body 121, 122, which each cover an angular range of about 120° and are arranged at different angles of rotation with respect to the circumference of the second component 20.

Figure 8:
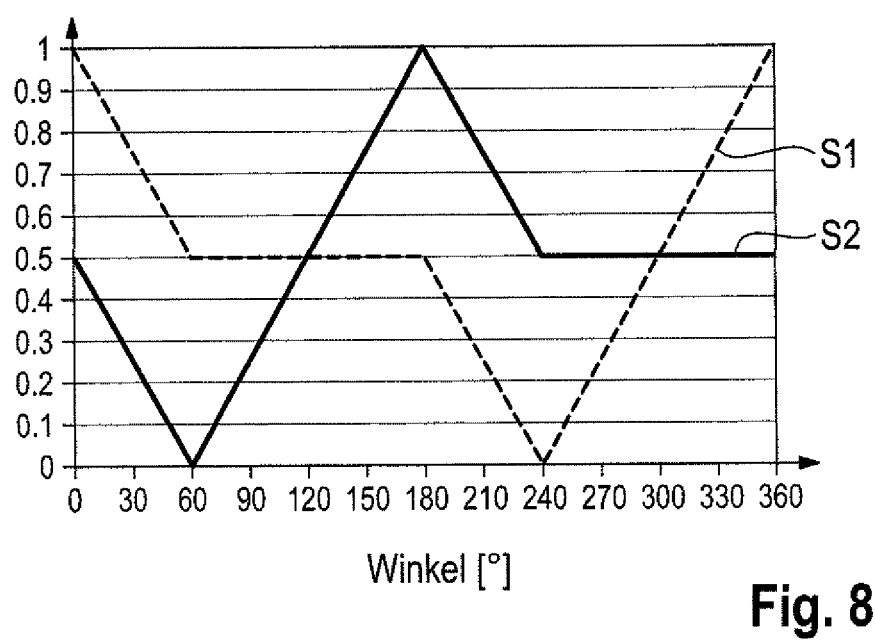
FIG. 8 shows an angle-dependent signal waveform of this rotary encoder.

FIG. 8 shows the measurement signals detectable at such position sensor 2 at the first and second reference coils L1, L2 and normalized to a maximum value of an arbitrary unit. For this purpose, e.g. the circuit shown in FIG. 1 can be provided twice, so that the damped oscillation occurring in the first and second reference coils L1 and L2 can be evaluated separately. In FIG. 8, the broken line shows the signal S1 obtained by evaluating the oscillation present in the first reference coil L1, the continuous line shows the corresponding signal S2 for the second reference coil L2. As is shown in FIG. 8, at angles of rotation between 0° and 270° the illustrated arrangement supplies values to which a specific angle can clearly be associated. By expanding the arrangement to further detection coils and possibly further reference bodies, both a higher angular resolution and a greater angular range can be achieved.

Figure 9A:
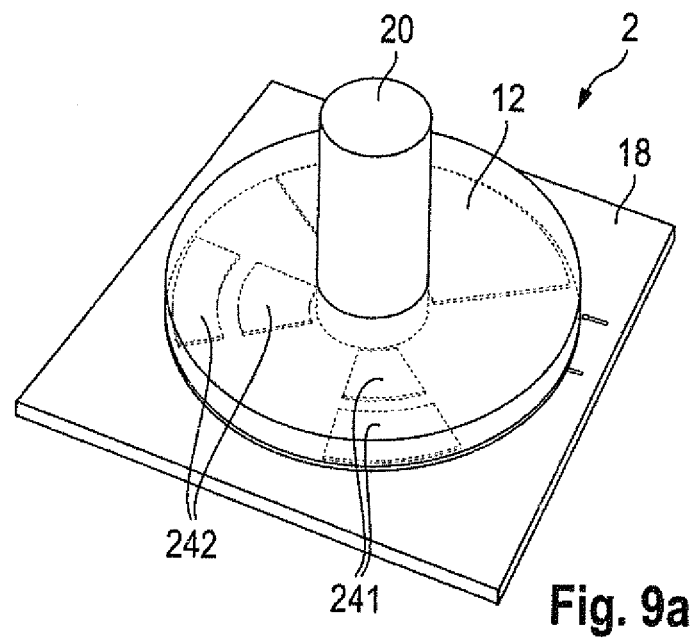
FIGS. 9a and 9b show a further position sensor designed as rotary encoder according to an exemplary embodiment.
Figure 9B:
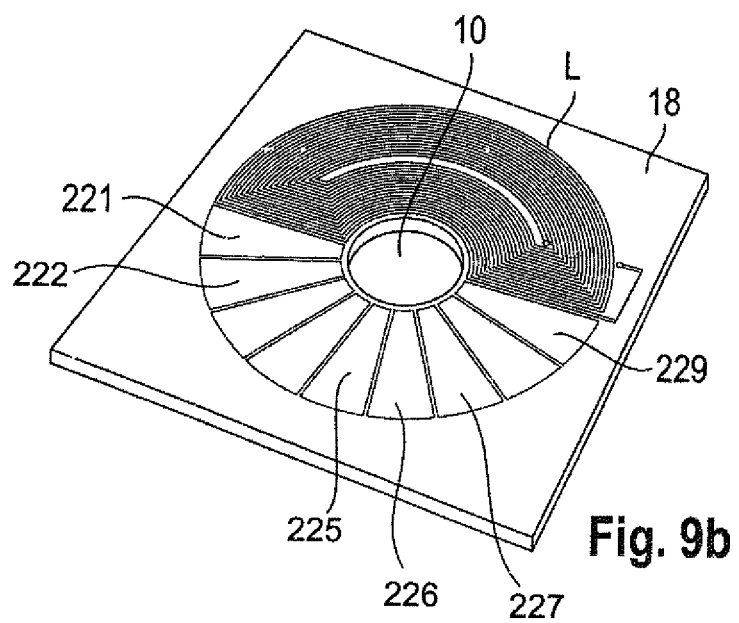

FIG. 9 shows a further exemplary embodiment for a position sensor 2 designed as rotary encoder (cf. FIG. 9a). A first component 18 (cf. FIG. 9b) comprises a reference coil L extending along half the circumference, of which only a few windings are shown by way of example. The same include a central surface 10 which extends along a partial segment of the circumference of a circle. While the reference coil L extends in the upper half (cf. FIG. 9b), capacitive electrodes 221 to 229 are located in the lower half of the first component 18, of which merely individual ones are provided with reference numerals by way of example. In the upper region of the first component 18, the reference coil L cooperates with a reference body 12 which is integrated into a second component 20 (cf. FIG. 9a). The electrodes 221 . . . 229 arranged in the lower region of the first component 18 cooperate with segmented counter-electrodes 241, 242 and form a capacitive rotary encoder. Thus, the position sensor shown in FIG. 9 makes use of two physically different angle detection methods. Thus, it satisfies the requirements for use in safety-relevant fields, e.g. for an automotive light switch. The angular range is limited to 120°, since this range is covered both by the inductive part of the position transmitter (reference coil L and reference body 12) and by the capacitive part of the position transmitter (electrodes 221 . . . 229 and counter-electrodes 241 and 242). Like the reference coil L, the electrodes 221 . . . 229 preferably are integrated into the first component 18, which preferably is a printed circuit board. The individual electrodes 221 . . . 229 are insulated against each other.

Depending on the location of the second component 20, two or more adjacent electrodes 221 . . . 229 form a capacitive short circuit with the counter-electrodes 241, 242. The angular position of the second component 20 can be detected by determining those electrodes which are involved in this capacitive short circuit. A typical capacitive detection method consists in feeding an electric charge into the electrodes 221 . . . 229 one after the other and in checking whether charge has accumulated on one of the adjacent electrodes. If this is the case, the correspondingly fed electrode 221 . . . 229 and its adjacent electrode is at least partly covered by the same counter-electrode 241, 242. In the angular position shown in FIG. 9 by way of example, the electrode pairs 221, 222 and 226, 227 are covered by the counter-electrodes 242 and 241, respectively. Further details of the capacitive detection method can be taken from the application DE 10 2010 046 778 of the same applicant.

At the same time, the angular position can be detected with reference to the eddy losses induced in the reference body 12. The counter-electrodes 241, 242 are slotted, so that the same only have a small influence on the signal derived from the reference coil L. The field generated by the reference coil L passes through the counter-electrodes 241, 242 more or less unimpeded. The determined angles of rotation of both detection methods (inductive and capacitive) can be compared and thus be checked for plausibility.

Figure 10:
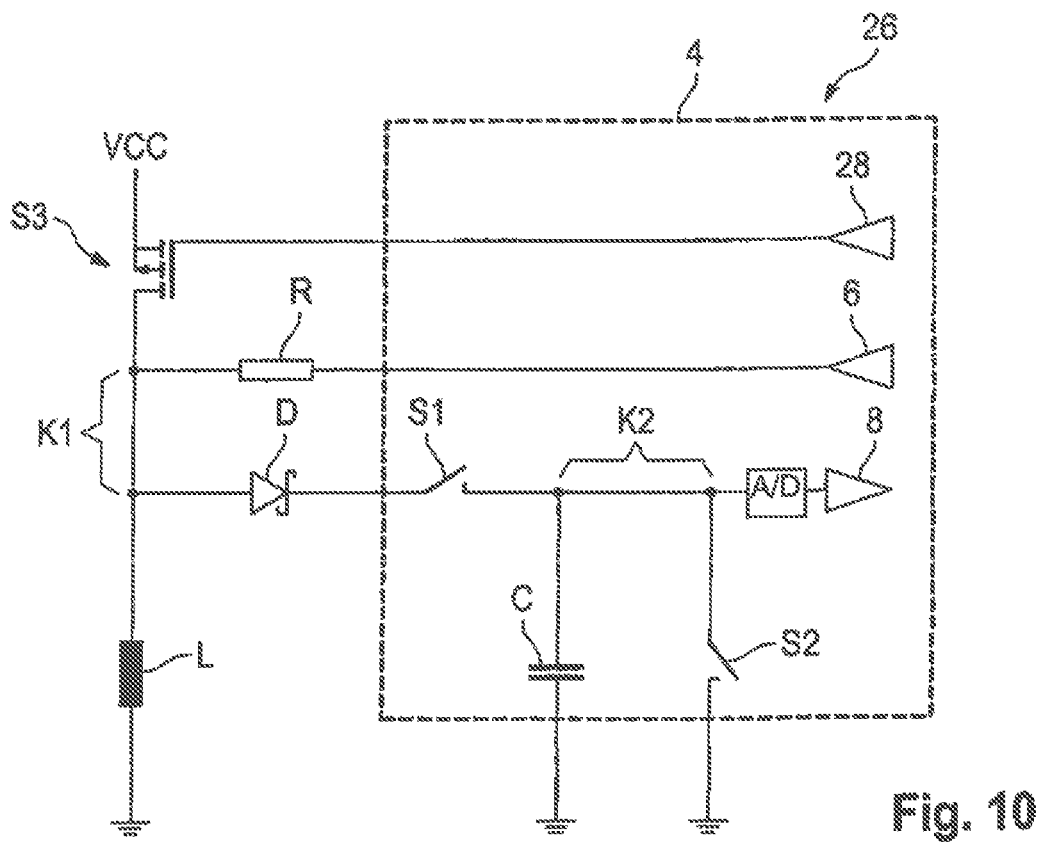
FIG. 10 shows a simplified circuit diagram of an actuator-sensor device according to an exemplary embodiment.

FIG. 10 shows a simplified circuit diagram of an actuator-sensor device 26 according to a further exemplary embodiment. The illustrated circuit diagram corresponds to the one in FIG. 1, wherein the microcontroller 4 now has a further output 28 instead of an output 6. In addition, a third switch S3, which preferably is a MOSFET, is connected between a supply voltage VCC and the first node K1. For the case that a MOSFET is used as third switch S3, its switching channel is connected between the supply voltage VCC and the first node K1 and the further output 28 of the microcontroller 4 is connected with the gate of the MOSFET.

Figure 11:
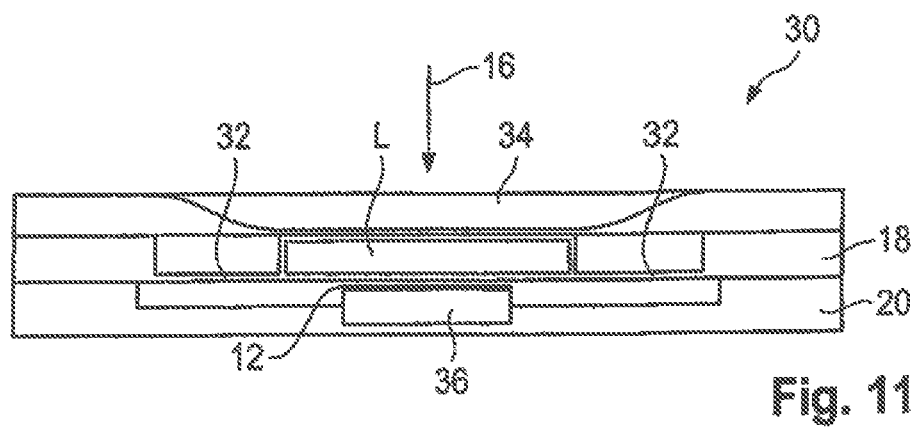
FIG. 11 shows a schematic cross-section through this actuator-sensor device.

The illustrated actuator-sensor device 26 allows a feedback control between an actuator and a position sensor. This will now be explained by way of example with reference to the push button 30 shown in FIG. 11 in a simplified cross-sectional view. A first component 18 of this push button 30 comprises a schematically illustrated reference coil L which preferably is accommodated in a section of this first component 18 connected by webs 32 with the remaining part of the first component 18, which preferably is a printed circuit board. A force acting in vertical direction 16 can be applied to this section of the first component 18 via a trough 34, so that the distance between the reference coil L and a reference body 12 accommodated in the second component 20 of the push button 30 can be reduced in vertical direction 16. In addition, preferably as an integral part of the second component 20, a permanent magnet 36 is located in vertical direction 16 below the reference coil L. When the distance between the reference coil L and the reference body 12 now is changed for example due to a mechanical pressure on the trough 34, a signal indicating this reduction of the distance can be detected at the input 8 of the actuator-sensor device 26 shown in FIG. 10 due to the processes already mentioned above. At the same time, a haptic feedback can be provided to the user via the actuator part of the actuator-sensor device 26 (i.e. of the push button 30). This is effected in that via the further output 28 a current impulse is applied to the reference coil L by means of the third switch S3. Since the field lines of the permanent magnet 36 permeate the reference coil L, a repelling or attracting force is obtained between the central region of the first component 18 (which comprises the reference coil L) and the second component 20 of the push button 30, depending on the direction of the current applied to the reference coil L. Preferably, by alternately actuating the reference coil L with a stronger low-frequency current proceeding from the supply voltage VCC (by controlling the switch S3) an actuator function can be realized and by actuating the reference coil L with a weaker high-frequency signal a very compact and inexpensive push button with haptic feedback can be realized. With respect to the actuator part of the illustrated actuator-sensor device 26 reference is made to DE 10 2010 045 536 of the same applicant.

Figure 12:
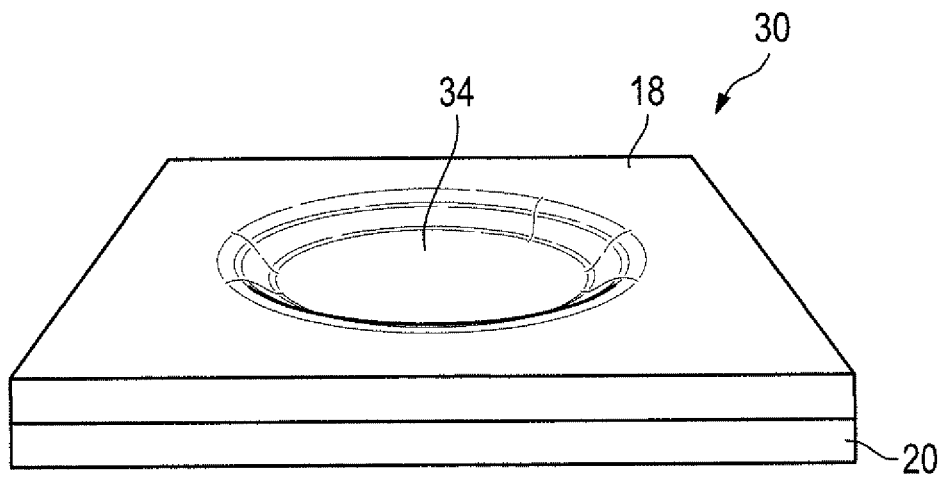
FIGS. 12 and 13 shows a perspective view of this actuator-sensor device from its upper and its lower surface.
Figure 13:
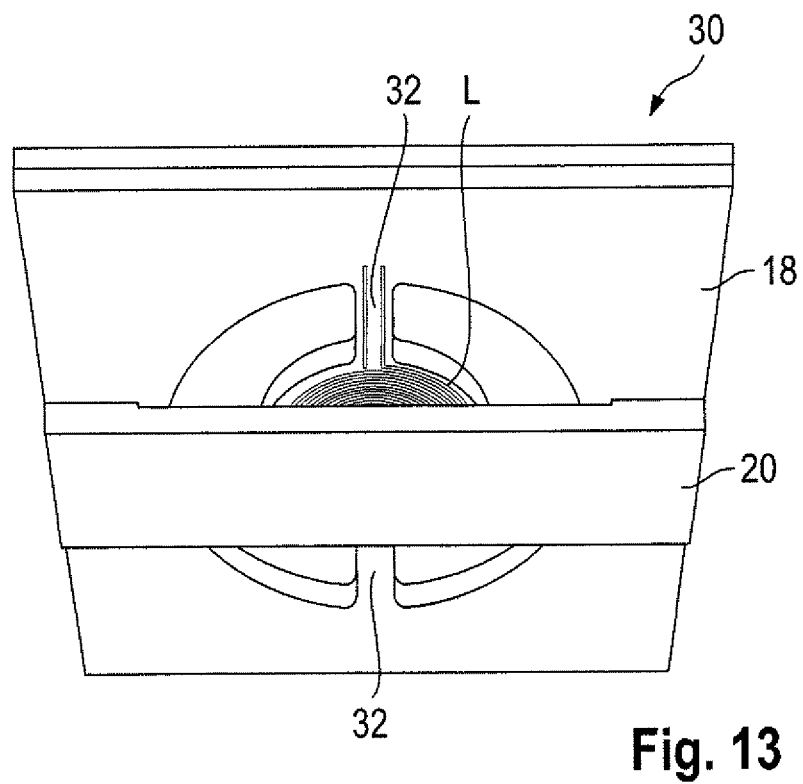

For further explanation, FIG. 12 shows the push button 30 in a perspective view from its upper surface. FIG. 13 shows the push button 30 from its lower surface. Merely the first component 18 is shown completely, the second component 20 is only partly shown, in order to show the reference coil L integrated into the first part 18 and held via webs 32.

LIST OF REFERENCE NUMERALS

2 position sensor
4 control and processing unit
6 output
8 input
10 central surface
12 reference body
121 first reference body
122 second reference body
14 lateral direction
16 vertical direction
18 first component
20 second component
221 . . . 229 electrodes
241 . . . 242 counter-electrodes
26 actuator-sensor device
28 further output
30 push button
32 webs
34 trough
36 permanent magnet
L reference coil
L1 first reference coil
L2 second reference coil
R resistor
C capacitor
K1 first node
K2 second node
S1 first switch
S2 second switch
S3 third switch
V1 square-wave voltage
V2 voltage at the reference coil L
V3 voltage at the capacitor C
VCC supply voltage

The invention claimed is:
1. A position sensor (2) for the inductive detection of a position of a first component (18) relative to a second component (20), the first component comprising a reference coil (L) and the second component (20) comprising a reference body (12), the position sensor (2) further comprising:
a control and processing unit (4) with an input (8) and an output (6), which each are coupled to the reference coil (L), wherein the control and processing unit (4) is configured to:
provide a current impulse as an output signal from the output (6) of the control and processing unit (4) to the reference coil (L) thereby generating a magnetic field in the reference coil (L), wherein the first and second components are arranged such that the magnetic field from the reference coil (L) is influenced by the reference body (12), resulting in a damped oscillation in the reference coil (L);
receive the damped oscillation as an input signal at the input (8) of the control and processing unit (4); and
evaluate the input signal to determine the position of the reference body (12) relative to the reference coil (L).
2. The position sensor (2) according to claim 1, the control and processing unit (4) being further configured to evaluate an amplitude of the damped oscillation generated by the current impulse in the reference coil (L) as the input signal to determine the position of the reference body (12).
3. The position sensor (2) according to claim 1, wherein
a) a first node (K1) is coupled with the output (6) and one side of the reference coil (L) and
b) a diode (D) is connected in forward direction between the first node (K1) and a second node (K2) coupled with the input (8) for evaluating the oscillation generated in the reference coil (L), and
c) a capacitor (C) is coupled between the second node (K2) and a fixed reference potential.
4. The position sensor (2) according to claim 3, in which a resistor (R) is coupled between the first node (K1) and the output (6).
5. The position sensor (2) according to claim 3, in which a first switch (S1) is connected between the diode (D) and the second node (K2).
6. The position sensor (2) according to claim 3, in which a second switch (S2) is coupled between the second node (K2) and the fixed reference potential.
7. The position sensor (2) according to claim 1, the control and processing unit (4) being further configured to provide a square-wave digital signal (V1) to the reference coil (L) via the output (6) of the control and processing unit (4), and wherein the input (8) of the control and processing unit (4) is coupled to an Analog to Digital converter comprised by the control and processing unit (4).
8. The position sensor (2) according to claim 1, in which the reference coil (L) is formed by a flat coil of conductor paths integrated into a printed circuit board or in Molded Interconnect Device technology.
9. The position sensor (2) according to claim 1, comprising one or more reference coils (L, L1, L2) whose windings are guided such that the one or more reference coils (L, L1, L2) define a coil core which determines the shape of the magnetic field generated such that a lateral displacement of the reference body (12) or a vertical displacement of the reference body (12) is detectable.
10. The position sensor (2) according to claim 1, wherein the detection is based on a capacitive detection measurement principle.
11. An actuator-sensor device (26) comprising:
a position sensor (2) according to claim 1;
and an actuator, the actuator comprising:

the first component (18) that includes the reference coil (L); and the second component (20) that further includes a permanent magnet (36), wherein the magnetic field of the permanent magnet (36) permeates the reference coil (L); and a third switch (S3) connected between a supply voltage (VCC) and a first node (K1) that is coupled with the output (6) and one side of the reference coil (L), wherein the control and processing unit (4) includes a further output (28) to provide a control signal to the third switch (S3) to provide the supply voltage (VCC) to the reference coil (L).

12. The actuator-sensor device (26) according to claim 11, in which the control and processing unit (4) is equipped for controlling the actuator in response to the relative position between the first and the second component (18, 20) as determined by the position sensor (2).

13. A method for the inductive detection of a position of a first component (18) comprising a reference coil (L) with respect to a second component (20) comprising a reference body (12), wherein the method comprises the following steps:

a) providing a current impulse as an output signal to generate a magnetic field in the reference coil (L), wherein the first and second components are arranged such that the magnetic field from the reference coil (L) is influenced by the reference body (12), b) generating a damped oscillation in the reference coil (L) as a result of the influence of the reference body (12) on the magnetic field, c) receiving the damped oscillation as an input signal at a control and processing unit (4); and d) evaluating the input signal to determine the position of the reference body (12) with respect to the reference coil (L).

14. The method according to claim 13, in which the step of evaluating comprises an evaluation of the amplitude of the damped oscillation generated by the current impulse in the reference coil (L) as provided by the input signal.

15. The method according to claim 13, in which a control and processing unit (4) with an input (8) for receiving the input signal is coupled to the reference coil (L) and an output (6) of the control and processing unit (4) and one side of the reference coil (L) are coupled to a first node (K1), wherein a diode (D) is connected in forward direction between the first node (K1) and a second node (K2) coupled with the input (8) and a capacitor (C) is coupled between the second node (K2) and a fixed reference potential, wherein the step of evaluating further comprises the evaluation of a voltage obtained over the capacitor (C) as the input signal to determine the position of the reference body (12) with respect to the reference coil (L).

16. The method according to claim 13, in which the position of the first component (18) with respect to the second component (20) is determined based on a comparison of the inductive detection of a position and a capacitive detection of a position, wherein the first component (18) further comprises a plurality of electrodes (221, 222, 223, 224, 225, 226, 227, 228, 229), and the second component (20) further comprises a plurality of counter-electrodes (241, 242), a method for the capacitive detection of a position comprises the following steps:

a) providing an electric charge to the plurality of electrodes (221, 222, 223, 224, 225, 226, 227, 228, 229);

b) sensing a capacitive short circuit at an electrode of the plurality of electrodes (221, 222, 223, 224, 225, 226, 227, 228, 229) that is opposite a counter-electrode of the plurality of counter-electrodes (241, 242);

c) identifying each electrode of the plurality of electrodes (221, 222, 223, 224, 225, 226, 227, 228, 229) involved in the short circuit; and d) determining the position of the first component (18) relative to the second component (20) based on the identification of the plurality of electrodes (221, 222, 223, 224, 225, 226, 227, 228, 229).

17. The actuator-sensor device (26) according to claim 11, in which the supply voltage (VCC) is provided to the reference coil (L) to generate a feedback signal in response to the control signal from the further output (28).

\* \* \* \* \*